(12) United States Patent
Chen et al.

(10) Patent No.: US 9,767,210 B2
(45) Date of Patent: *Sep. 19, 2017

(54) DYNAMICALLY ENHANCING USER INTERFACE

(71) Applicant: INTERNATIONAL BUSINESS MACHINES CORPORATION, Armonk, NY (US)

(72) Inventors: Danny Y. Chen, Austin, TX (US); Fabian F. Morgan, Austin, TX (US); Sarah V. White Eagle, Austin, TX (US); Chuan Yang, Beijing (CN); Dan Dan Zheng, Beijing (CN); Zhe Yan, Beijing (CN)

(73) Assignee: International Business Machines Corporation, Armonk, NY (US)

(*) Notice: Subject to any disclaimer, the term of this patent is extended or adjusted under 35 U.S.C. 154(b) by 242 days.

This patent is subject to a terminal disclaimer.

(21) Appl. No.: 13/852,685

(22) Filed: Mar. 28, 2013

(65) Prior Publication Data
US 2014/0298185 A1 Oct. 2, 2014

(51) Int. Cl.
G06F 3/048 (2013.01)
G06F 17/30 (2006.01)

(52) U.S. Cl.
CPC ................... *G06F 17/3089* (2013.01)

(58) Field of Classification Search
None
See application file for complete search history.

(56) References Cited

U.S. PATENT DOCUMENTS

| | | |
|---|---|---|
| 5,392,390 A | 2/1995 | Crozier |
| 5,689,701 A | 11/1997 | Ault et al. |
| 5,974,238 A | 10/1999 | Chase, Jr. |
| 6,085,228 A | 7/2000 | Tharakan |
| 6,233,589 B1 | 5/2001 | Balcha et al. |
| 7,069,501 B2 | 6/2006 | Kunitake et al. |
| 7,143,094 B2 | 11/2006 | Arroyo et al. |
| 7,277,924 B1 * | 10/2007 | Wichmann et al. .......... 709/217 |
| 7,299,240 B1 | 11/2007 | Crozier |
| 7,600,219 B2 | 10/2009 | Tsantilis |

(Continued)

FOREIGN PATENT DOCUMENTS

CN 102968486 A 3/2013

OTHER PUBLICATIONS

Jan. 30, 2015 Office Action in U.S. Appl. No. 13/852,571.

(Continued)

*Primary Examiner* — Tuan S Nguyen
(74) *Attorney, Agent, or Firm* — Lisa Ulrich, Esq.; Heslin Rothenberg Farley & Mesiti, PC; George S. Blasiak, Esq.

(57) ABSTRACT

An approach is provided for dynamically enhancing and visually synchronizing elements in a display on a computing device. The approach includes using a processor to obtain a change to a first file and data identifying a second file one or more characteristics from a source file. The processor determines if the change is supported by a data library and analyzes the data library to determine the type of change. The processor then applies the type of change to the second file and generates a display associated with the second file on the computing device that includes the type of change applied to the second file.

21 Claims, 11 Drawing Sheets

```
ITINERARY  AUS-LAS Friday 05/04/12 @7:25 AM

DEPART   07:25PM Austin, TX(AUS) to        FLIGHT    Friday, May 4, 2012
MAY 4    08:25PM Las Vegas, NV(LAS)        #1345     Travel Time 3h 00m
FRI                                                  (Nonstop)
         LAS-AUS Friday 05/06/12 @7:25 AM           Wanna Get Away RETURN   07:15AM Las Vegas, NV(LAS) to      FLIGHT   Sunday, May 6, 2012
MAY 6    11:50AM Austin, TX(AUS)            #1729    Travel Time 3h 35m
SUN                                                  (Nonstop)
                                                     Wanna Get Away
```

(56) References Cited

U.S. PATENT DOCUMENTS

| | | | |
|---|---|---|---|
| 7,657,769 | B2 | 2/2010 | Marcey et al. |
| 7,665,063 | B1 | 2/2010 | Hofmann et al. |
| 7,693,840 | B1* | 4/2010 | Berck et al. .................. 709/203 |
| 7,693,848 | B2 | 4/2010 | DeJean et al. |
| 7,703,004 | B2 | 4/2010 | Bier |
| 7,738,497 | B2 | 6/2010 | Vishnia-Shabtai et al. |
| 7,779,395 | B1 | 8/2010 | Chotin et al. |
| 7,793,224 | B1 | 9/2010 | Ayers |
| 7,836,441 | B2 | 11/2010 | Chen et al. |
| 7,870,226 | B2* | 1/2011 | Anna ................ G06F 17/30194 |
| | | | 709/218 |
| 7,904,807 | B2 | 3/2011 | Bell et al. |
| 8,655,850 | B2 | 2/2014 | Ngo et al. |
| 9,665,593 | B2 | 5/2017 | Chen et al. |
| 2002/0174329 | A1 | 11/2002 | Bowler et al. |
| 2002/0194484 | A1 | 12/2002 | Bolosky et al. |
| 2003/0014445 | A1 | 1/2003 | Formanek et al. |
| 2003/0160810 | A1 | 8/2003 | Talley et al. |
| 2004/0019663 | A1 | 1/2004 | Viswanath et al. |
| 2004/0088653 | A1 | 5/2004 | Bell et al. |
| 2005/0132346 | A1 | 6/2005 | Tsantilis |
| 2006/0047974 | A1 | 3/2006 | Alpern et al. |
| 2008/0065698 | A1 | 3/2008 | French et al. |
| 2008/0189678 | A1 | 8/2008 | Joe et al. |
| 2008/0235578 | A1 | 9/2008 | Heed et al. |
| 2008/0276230 | A1 | 11/2008 | Chang et al. |
| 2009/0150569 | A1 | 6/2009 | Kumar et al. |
| 2009/0204647 | A1 | 8/2009 | Bentley et al. |
| 2010/0241948 | A1 | 9/2010 | Andeen et al. |
| 2011/0119676 | A1 | 5/2011 | Gallant et al. |
| 2011/0218964 | A1 | 9/2011 | Hagan et al. |
| 2012/0310937 | A1* | 12/2012 | Stibel et al. .................. 707/737 |
| 2012/0331128 | A1* | 12/2012 | Seifert et al. ................ 709/224 |
| 2013/0204837 | A1 | 8/2013 | Sabharwal |

OTHER PUBLICATIONS

Apr. 29, 2015 Response to Office Action in U.S. Appl. No. 13/852,571.

Non-Final Office Action from the United States Patent and Trademark Office in U.S. Appl. No. 14/928,653 dated Feb. 11, 2016.

Feb. 11, 2016 Office Action in U.S. Appl. No. 14/928,653.

May 11, 2016 Response to Office Action in U.S. Appl. No. 14/928,653.

Aug. 25, 2016, Office Action from USPTO in U.S. Appl. No. 14/928,653.

Notice of Allowance and Fee(s) Due for U.S. Appl. No. 13/852,571, mailed on Dec. 19, 2016.

Office Action issued by the Chinese Patent Office for Chinese Patent Application No. 201410122905.6, mailed on Dec. 2, 2016.

Applicant's Response to Sep. 6, 2016 Non-Final Office action for U.S. Appl. No. 13/852,571, filed Nov. 28, 2016.

Applicant's Response to Aug. 25, 2016 Non-Final Office action for U.S. Appl. No. 14/928,653, filed Nov. 25, 2016.

Office Action for U.S. Appl. No. 13/852,571, mailed on Sep. 6, 2016.

Chen, et al., Response to Final Office action for U.S. Appl. No. 14/928,653, filed Oct. 30, 2015 (U.S. Patent Publication No. 2016/0055172 A1), dated May 9, 2017.

Chen, et al., Final Office action for U.S. Appl. No. 14/928,653, filed Oct. 30, 2015 (U.S. Patent Publication No. 2016/0055172 A1), dated Apr. 4, 2017 (14 pages).

Notice of Allowance and Fee(s) Due for U.S. Appl. No. 14/928,653, dated May 30, 2017.

\* cited by examiner

| | | | |
|---|---|---|---|
| DEPART<br>MAY 11<br>FRI | 06:30AM Austin, TX(AUS) to<br>07:30AM Las Vegas, NV(LAS) | FLIGHT<br>#2942 | Friday, May 11, 2012<br>Travel Time 3h 00m<br>(Nonstop)<br>Wanna Get Away |
| RETURN<br>MAY 14<br>MON | 06:00AM Las Vegas, NV(LAS) to<br>07:05AM Arrive in Phoenix, AZ(PHX)<br><br>08:15AM Change ✈ in Phoenix, AZ(PHX)<br>12:29PM Austin, TX(AUS) | FLIGHT<br>#209<br><br>FLIGHT<br>#209 | Monday, May 14, 2012<br>Travel Time 4h 25m<br>(1 stop, includes 1 plane change)<br>Wanna Get Away |

FIG 6

AUS-LAS Friday 05/11/12 @ 7:30AM

FIG 7

| | | | |
|---|---|---|---|
| ITINERARY | *AUS-LAS Friday 05/04/12 @7:25 AM* | | |
| DEPART<br>MAY 4<br>FRI | 07:25PM Austin, TX(AUS) to<br>08:25PM Las Vegas, NV(LAS)<br><br>*LAS-AUS Friday 05/06/12 @7:25 AM* | FLIGHT<br>#1345 | Friday, May 4, 2012<br>Travel Time 3h 00m<br>(Nonstop)<br>Wanna Get Away |
| RETURN<br>MAY 6<br>SUN | 07:15AM Las Vegas, NV(LAS) to<br>11:50AM Austin, TX(AUS) | FLIGHT<br>#1729 | Sunday, May 6, 2012<br>Travel Time 3h 35m<br>(Nonstop)<br>Wanna Get Away |

FIG 8

DYNAMICALLY ENHANCING USER INTERFACE

TECHNICAL FIELD

One or more aspects of the present invention relate to dynamically enhancing and visually synchronizing elements displayed in a graphical user interface.

BACKGROUND

Thin client interfaces, such as web browsers, allow users to access varied information on websites. Different websites provide similar information, but because websites are maintained by different entities, websites can display similar information in different formats. The difference in displays for similar types of information can complicate a user's attempts to compare similar information from different sources.

BRIEF SUMMARY

Shortcomings of the prior art are overcome and additional advantages are provided through the provision of a method for dynamically enhancing and visually synchronizing elements in a display on a computing device. The method includes, for instance: obtaining a change to a first file and data identifying a second file, determining, if the change is supported by a data library; analyzing the data library to determine a type of the change; applying, the type of the change to the second file; and generating a display associated with the second file on the computing device in which the display comprises the type of change applied to the second file.

Shortcomings of the prior art are overcome and additional advantages are provided through the provision of a computer program product for dynamically enhancing and visually synchronizing elements in a display on a computing device. The computer program product includes, for instance, a computer readable storage medium readable by a processing circuit and storing instructions for execution by the processing circuit for performing a method including: obtaining a change to a first file and data identifying a second file, determining, if the change is supported by a data library; analyzing the data library to determine a type of the change; applying, the type of the change to the second file; and generating a display associated with the second file on the computing device in which the display comprises the type of change applied to the second file.

Computer systems and methods relating to one or more aspects of the present invention are also described and may be claimed herein. Further, services relating to one or more aspects of the present invention are also described and may be claimed herein.

Additional features are realized through other embodiments of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing objects, features, and advantages of one or more aspects of the invention are apparent from the following detailed description taken in conjunction with the accompanying drawings in which:

FIGS. 6-10 depict one or more aspects of an embodiment of a method for dynamically enhancing and visually synchronizing elements in a display on a computing device.

DETAILED DESCRIPTION

Figure 1:
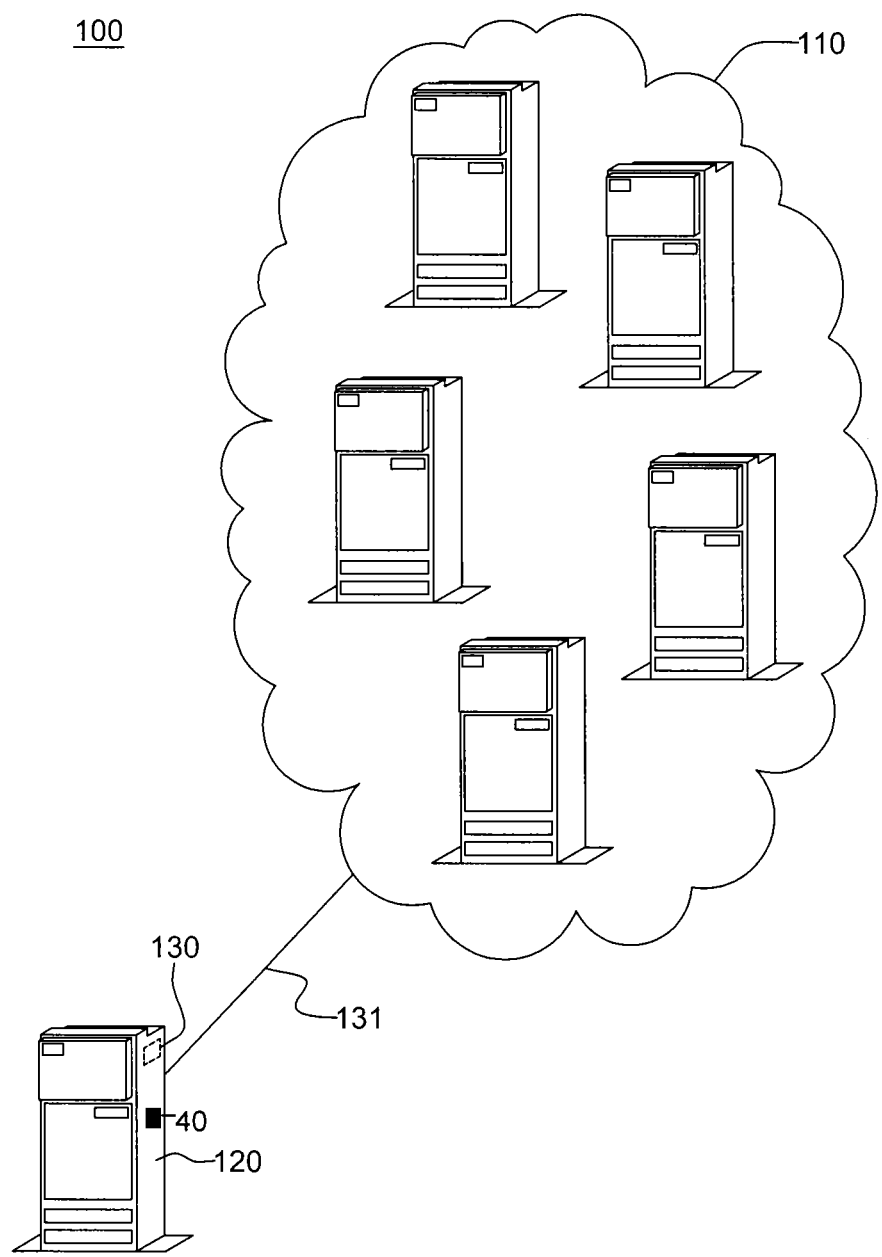
FIG. 1 depicts one example of a computing environment used to execute one or more aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 1 depicts one example of a computing environment 100 used to execute one or more aspects of an embodiment of the present invention. In this embodiment, a computer system 110, which can include a cloud and/or an enterprise system, is being monitored by a server 120, which is connected to the computer system 110 via a network connection 131. This network connection 131 includes, but is not limited to, a wireless and/or a wired connection. Dynamic user interface enhancement software 40 is being executed by one or more processors (not pictured) on the server 120. In further embodiments of the present invention, dynamic user interface enhancement software 40 is executed on a resource of the computer system 110. In further embodiments of the present invention, the dynamic user interface enhancement software 40 is installed on a client computing device (not pictured) with a network connection to one or more resources of the computer system 110. In further embodiments of the present invention, the execution of the software 40 is distributed on one of more resources external and/or internal to the computer system 110.

The server 120 and the additional resources within the computer system 110 each execute different software to enable a range of functionality to users connected to one or many of the resources. The computer logic, the code, that comprises the different software resides on memory resources (not pictured) internal and external to the server 120 and/or the various resources of the computer system 110. This computer logic includes, but is not limited to, the dynamic user interface enhancement software 40. A client computing device (not pictured) connects to the server 120 and utilizes the different software implemented on the server 120 and on the computer system 110.

Computer system 110 and the server 120, and client computing devices (pictured in FIG. 2) connected to one or more of these resources, access one or more data libraries 130. In FIG. 1, the data libraries 130 are centralized in memory on the server 120. However, in further embodiments of the present invention, the data libraries 130 are local to computing devices (not pictured), including but not limited to client computing devices, and/or resources in the computer system 110. In an embodiment of the present invention where computer system 110 is a cloud, the data libraries 130 are distributed over the various resources accessible to server 120. In various embodiments of the present invention, some of the libraries 130 may be local, and/or on memories that are accessible locally, while others are centralized either on the server 120 and/or one or more separate memories that are external but accessible to the server 120, including, but not limited to, on a cloud resource in a cloud computing environment.

The data libraries 130 house data that define and support changes in display options for web pages in thin client applications, such as web browsers. These files include, but are not limited to, files containing computer code for execution by the processors of the resources in the computer system 110.

Figure 2:
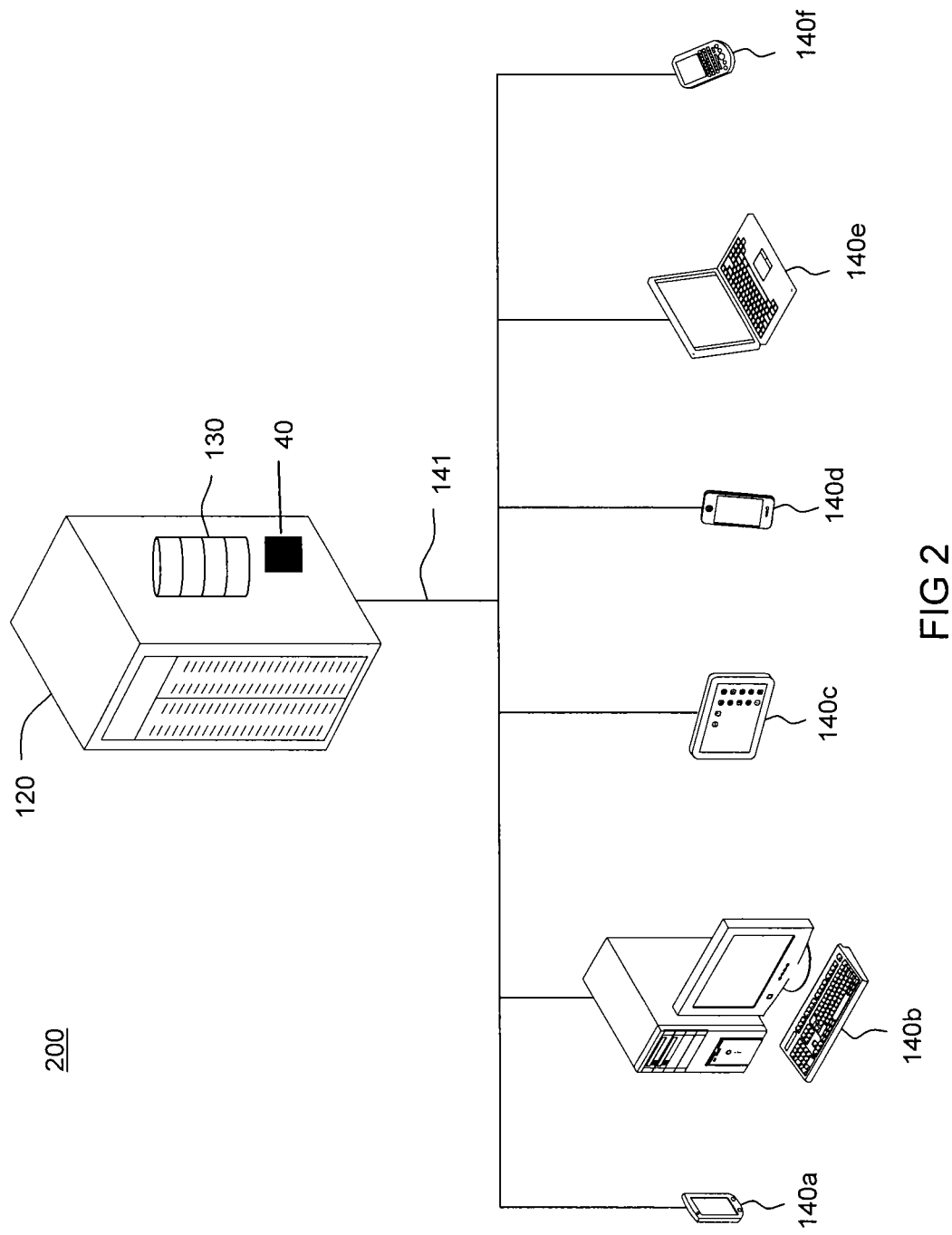
FIG. 2 depicts an aspect of the computing environment of FIG. 1.

FIG. 2 depicts an expanded view of an aspect of the computing environment 100 of FIG. 1. Referring to FIG. 2, computing devices 140a-140f, discussed but not pictures in FIG. 1, are connected to server 120 via a the network connection 141, which includes, but is not limited to, a wireless and/or a wired connection. Computing devices 140a-140f include, but are not limited to, personal computing devices, including desktop computers, laptop computers, tablet computers, PDAs and handheld computing devices, including but not limited to, smart phones. In an embodiment of the present invention, each computing device 140a-140f is capable of displaying a thin client application, such as an Internet browser, through a graphical user interface (GUI). Additionally, each client computing device 140a-140f is capable of displaying an editing program, including but not limited to, notepad, through its GUI. The editing programs can be installed on fat clients and/or client/server applications and are accessible via a GUI displayed on the client computing devices 140a-140f. In additional embodiments of the present invention, the editor component is integrated into the thin client.

Each of the computing devices 140a-140f can access the dynamic user interface enhancement software 40. As aforementioned, in this embodiment, the software 40 is being executed by one or more processors (not pictured) on the server 120. As discussed earlier, in further embodiments of the invention, the software 40 is executed by a processor (not pictured) on a computing device 140a-140f, and/or is distributed or wholly executed on one of more resources external and/or internal to the computer system 110.

Each of the computing devices 140a-140f can be utilized to access computer code that renders as web sites on the aforementioned thin clients of the computing devices 140a-140f. Those of skill in the art that will recognize that this action is commonly referred to as accessing websites on the Internet. Returning to FIG. 2, a computing device 140a-140f requests data from a given web site, for example, when a user and/or process enters a URL in the thin client and/or browser on the computing device 140a-140f. The computing device 140a-140f accesses a web server (not pictured) internal or external to the computer system 110. The web server (not pictured) serves the requested code. The computing device 140a-140f receives the code and the thin client and/or web browser renders a display of the web site in the graphical user interface of the thin client and/or browser.

Many websites accessible to a computing device 140a-140f provide the user of the computing device 140a-140f with the same type of information. For example, a user utilizing a computing device 140a-140f can access any number of websites with airline flight pricing information. Users may have difficulty comparing similar information across different websites when the same type of information is displayed differently.

By utilizing the software 40, a user who accesses a web site with a computing device 140a-140f can customize the display of the web site by making at least one change to a source file associated with a portion of the site. After the user implements this change, the software 40 determined whether this type of change is supported by one or more of the data libraries 130. If one or more data libraries 130 supports the change, then, the software 40 applies this type of change to one or more additional files, target files, associated with one or more additional websites.

Accordingly, as set forth herein, when a user makes a change to a source file by utilizing a computing device 140a-140f, the software 40 obtains the change to the file. This change is the difference in the file between an existing item in the file and a new item. In an embodiment of the present invention, after a user and/or administrative process makes a change to a file, such as on a computing device 140a-140f, the software 40 obtains the change. For example, in an embodiment of the present invention, a user utilizes a computing device 140a-140f to view and edit a file displayed in a web browser in the computing device 140a-140f. For example, a user utilizes the "view source" functionality in a web browser to view the source code of a file displayed in the browser window in a text editing program executed by a processor (not pictured) on the computing device 140a-140f. The user changes a certain element in the source file. The software 40 compares the original element in the source file to the changed element in the source file.

In addition to obtaining the change to the source file, the software 40 also obtains data identifying a second file accessible to the computing device 140a-140f. This second file, also referred to as a "target file," is described in more detail in reference to the embodiment of FIG. 3. Like the initial source file, a target file is also a file associated with a web page displayed in a thin client, such as a web browser, on a computing device 140a-140f.

After the software 40 obtains the change to the source file and the data identifying the target file, the software 40 determines if this change is supported by one or more of the data libraries 130. The software 40 checks the change, i.e., a changed element now in this source file and determines if one or more of the data libraries 130 support the change. A supported change is one that is consistent with the data in one or more of the data libraries 130, i.e., a known change. In response to the software 40 recognizing that the change to the source file is a known change, i.e., supported by one or more of the data libraries 130, the software 40 can apply the same type of change by making a similar change to the target file when a computing device 140a-140f displays a web page associated with the target file.

In accordance with an embodiment of the present invention, in making the similar change to the target file, the software 40 may analyze data in one or more of the data libraries 130 to formulate a new item to apply to the target file. In an embodiment of the present invention, the software 40 and may insert the new item into the target file, and may overwrite an existing item in the target file with this new item. The software 40 implements changes using one or more of the data libraries 130 that represent changes to file content and elements. In an embodiment of the present invention, the software 40 makes changes to the target file that are not always identical to the changes the user made to the source file. Rather, the software 40 makes changes of the same type, as recognized by the software 40 by accessing one or more of the data libraries 130 and comparing a change in a source file to the data stored in one or more of the data libraries 130.

The new item that the software 40 gleans from analyzing one or more of the data libraries 130 is not necessarily identical to the changed item in the source file. Although the data in the target file may be different from the data in the source file, i.e. the target file can contain different text, the software 40 makes the same type of change to the target file that was made to the source file. For example, in an embodiment of the present invention, a user edits a source file to change the manner in which a type of data, for example, the name of a location, displays. Specifically, the user replaces the full name in the source file with an abbreviation. The software 40 detects this change in the source file and then checks the change against one or more of the data libraries 130, to see if this change is defined in one or more of the data libraries 130. After the software 40 determines that the change is supported by one or more of the data libraries 130, the software 40 retains the change and/or type of change and makes the same type of change to the target file when a computing device 140a-140f displays a web page associated with the target file in a thin client, such as a browser.

Because the data in the target file is not always identical to the data in the source file, after the software 40 makes the same type of change to the target file based on a change the software 40 obtained in the source file, neither original content of the source file and the target file nor the changed content of the source file and the target file may match. The software 40 analyzes one or more of the data libraries 130 and based on the data in one or more of the data libraries 130, the software 40 determines the type of change that was made to the source file and formulates how to apply this type of change to the target file. For example, in an embodiment of the present invention, the target file can contain a different location name than the source file, but the software 40 will apply make the same type of change to the target file as was made to the source file.

In an embodiment of the present invention, software 40 retains the change and/or the type of change made to a source file, provided that the change and/or type of change is one that is defined in one or more of the data libraries 130, and provided that the same type of change can be applied by the software 40 to one or more target files. In this embodiment, software 40 retains the change and/or type of change in a local or network profile, associated with a user, and automatically applies the same type of change to additional files that the software 40 recognizes as target files. In a further embodiment of the present invention, the type of change and/or profile is stored locally on the computing device 140a-140f the user used to make the change to the source file. In a further embodiment of the present invention, the software 40 stores in one or more of the data libraries 130 one or more changes and/or one or more types of changes between a source file and all relevant target files. Thus, after a user and/or process implements one or more changes and/or one or more types of changes (recognized and supported by one or more of the data libraries 130) to a source file, when a user utilizes a client computing device 140a-140f to access a web page associated with one of the target files, the software 40 automatically implements the same type of change in the accessed target file relevant to this source file. In order to identify the target files to change, in an embodiment of the present invention, the software 40 consults a predefined list of web sites stored on a local and/or system resource, such as in one or more of the data libraries 130, or in memory on a computing device 140a-140f.

Figure 3:
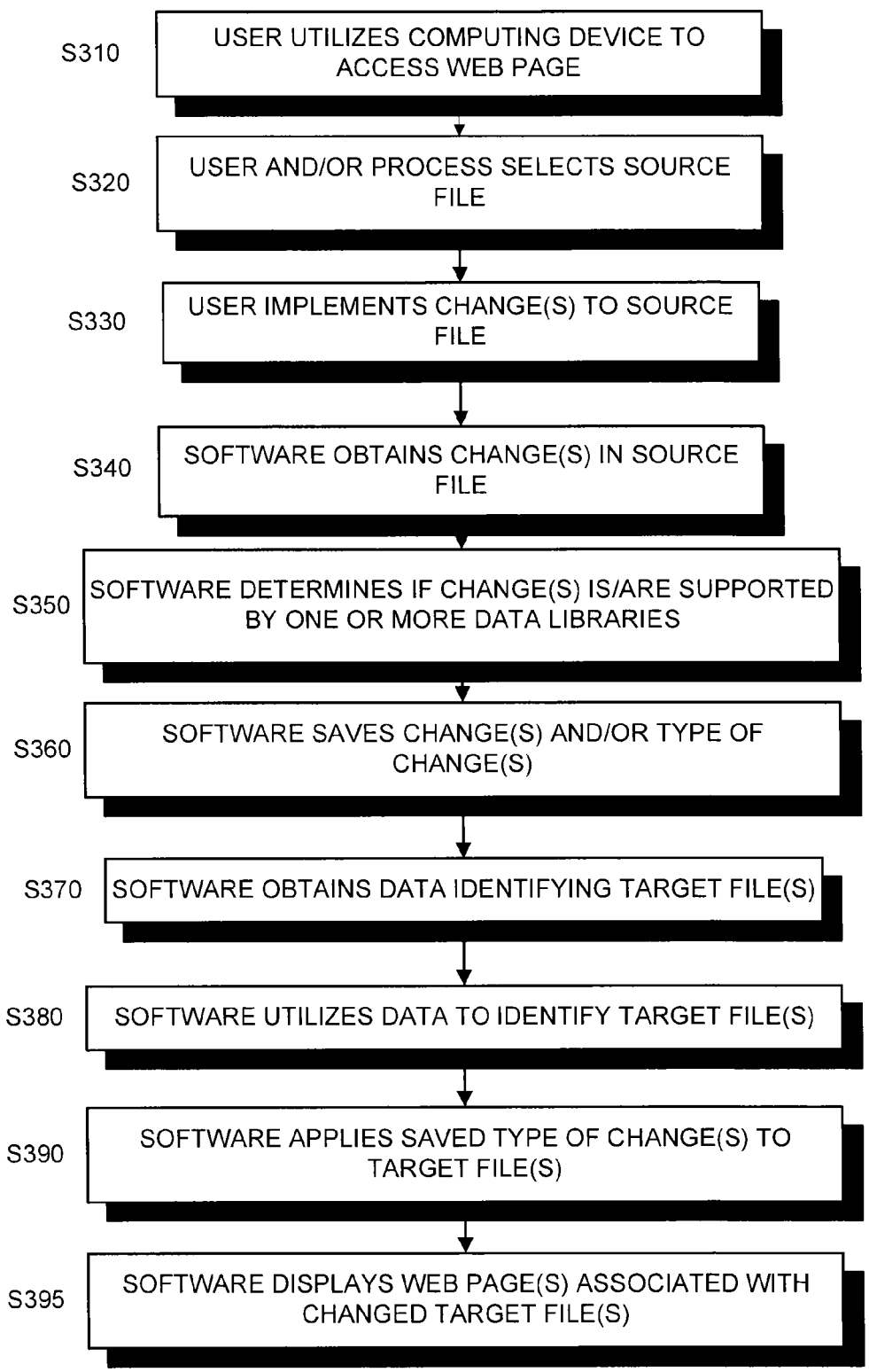
FIG. 3 depicts a workflow of one embodiment of a method for dynamically enhancing and visually synchronizing elements in a display on a computing device, in accordance with one or more aspects of the present invention.

The computing environment 100 of FIGS. 1-2 is one of many computing environments that can be utilized to perform the workflow of an embodiment of the present invention in FIG. 3.

FIG. 3 depicts a workflow of one embodiment of a method for dynamically enhancing a user interface by synchronizing elements in files, in accordance with one or more aspects of the invention. For ease of understanding, the actions of the software 40 are portrayed as a single-threaded process. However, one of skill in the art will recognize that further embodiments of the present invention utilize both single and multi-threaded processes. Also, although the term "user" is used to represent an individual user, one of skill in the art will recognize that in further embodiments of the present invention, one or more users, one or more processes, and/or a combination of these examples can make changes.

Referring to FIG. 3, a user utilizes a thin client and/or web browser accessible on a computing device 140a-140f to view a web page in the thin client (S310). At the client computing device 140a-140f, the user selects a source file associated with the web page (S320). The user implements changes to the source file (S330). In an embodiment of the present invention, a user can make one or more changes to the source file. The user can make the one or more changes to the source file using, for example, an editor, such as a proprietary editor, a web browser plug-in, Word, WordPad, an email-related text editor (Notes, Outlook, web), XML editor, IDE, generic web form, or notepad.

In accordance with embodiments of the present invention, a processor executing the software 40 obtains the changes the user made to the source file (S340). In an embodiment of the present invention, the processor executing the software 40 obtains the changes by tracking the changes through an audit trail while the changes are being made. During and/or after the user and/or process makes one or more changes to the source file, the processor executing the software 40 retains these changes on a memory resource in or accessible to the computing device 140a-140f.

The processor executing the software 40 then determines if the changes obtained by the software 40 are supported by one or more of the data libraries 130 (S350). In an embodiment of the present invention, to make this determination, the software 40 analyzes the changes utilizing the one or more data libraries 130 to establish whether the changes are supported by one or more of the data libraries 130. In embodiments where the processor executing the software obtains the changes by tracking the changes through an audit trail while the changes are being made, the software 40 determines whether the tracked changes are changes that are supported by one or more of the data libraries 130. The changed source file may contain one or more changes that are supported by one or more different data libraries 130.

Changes that are supported by data libraries 130 include, but are not limited to, editorial changes, translation of text into a different language, re-sizing of graphics, changes in color, format, font, and/or style. For example, in an embodiment of the invention, a user makes changes to a source file (S330). Below, in Example 1, is the text in the source file before the user changes it.

10:10 pm—Visit Los Angeles (Example 1)

Below, in Example 2, is the text after the user changed it:

22:00: Visit LA (Example 2)

The user implemented the following changes to the source file: 1) the user changed the time to military time; 2) the user changed a dash was changed to a colon (in a certain context); 3) the user abbreviated the name of a US city. A processor executing the software 40 obtains the changes the user made to the source file (S340) and the processor executing the software 40 then determines if the obtained changes are supported by one or more of the data libraries 130 (S350). Each of the listed changes is potentially supported by one or more of the data libraries 130.

After the software 40 obtains one or more changes made to a source file and determines that the changes are supported in one or more of the data libraries 130, the software 40 retains the one or more changes and/or one or more types of changes (S360) on a resource in the computing environment 100, including but not limited to a server 120 and/or the computing device 140*a*-140*f*. In an embodiment of the present invention, the software 40 retains the determined one or more supported changes and/or one or more types of changes in a profile stored on a resource in the computing environment 100, including but not limited to a server 120 and/or the computing device 140*a*-140*f*.

The software 40 obtains data identifying files, target files, to which the same type of change should be applied (S370). Data the software 40 uses to identify these files includes, but is not limited, to data identifying a url, an ip address, a DNS server, a type of web site, key words, meta tags and/or other file element, and/or one or more domain. By obtaining the data, the software 40 identifies these files (referred to now as target files) as containing elements that should be changed based upon the initial change the user made to the source file in order to maintain consistency across a given computing environment 100. In an embodiment of the present invention, the software 40 obtains the data identifying the files by consulting a predefined list of identifying data. For example, in an embodiment of the present invention, a user can configure a "properties" file on a computing device 140*a*-140*f* and enter data identifying files to which the user desires the software 40 to apply a type of change. In an embodiment of the present invention, the software 40 receives a file and identifies part or all of the file as a target file when a client device 140*a*-140*f* requests and receives a web page from a web server. The computer resource from which the software 40 obtains files from which the software 40 identifies target files can be located on computing resources within one or more network domains.

After the software 40 has determined that a change is supported by one or more of the data libraries 130, and obtained data identifying additional files to which the software 40 can apply the same type of change, when the computing device 140*a*-140*f* receives one or more files that meet the identifying characteristics in the data the software 40 obtained (S380), the software 40 applies the same type of change(s) to the target files (S390). The software 40 displays the web page(s) associated with the target files with the changes in the display of the computing device (S395).

For example, in an embodiment of the present invention, a user utilizes a computing device 140*a*-140*f* to access a web site. In response to this request, the computing device 140*a*-140*f* receives at least one file that meets the file identification criteria defined in the data. The software 40 applies the same type of change(s) to this target file as the user applied to the source file. In an embodiment of the present invention, the software 40 applies the same type of change(s) to the target files by overwriting existing items in the target files with the new items from one or more of the data libraries 130.

In an embodiment of the present invention, after the software 40 has determined that a change is supported by a data library, the software 40 obtains the content of the changes that it will apply to the additional files from a data source, including but not limited to, a data library, a data source in the computing environment 100, a resource on the computing device 140*a*-140*f*, and/or a data source accessible to a resource in the computing environment 100. In an embodiment of the present invention, the software 40 provides a preview of and/or reports the change before applying the same type of change(s) to a target file.

Returning to the Examples 1 and 2, the changes that the user made to the source file were as follows: 1) the user changed the time to military time; 2) the user changed a dash was changed to a colon (in a certain context); 3) the user abbreviated the name of a US city. As explained earlier, the software 40 obtained these changes (S340) and determined that these changes are supported by one or more data libraries (S350). The software then saves these three supported changes and/or types of changes (S360). When the software obtains data identifying target files (S370), the software 40, in some embodiments, can analyze the one or more data libraries 130 to formulate the changes. The software 40 identifies target file(s) (S380) and then applies these types of changes to the target file(s) (S390), and displays the web pages associated with the target files with the changes in a display on the computing device 140*a*-140*f* (S395).

In the case of the first type of change the software 40 saved, namely changing time displays to military time, in an embodiment of the present invention, the software 40 receives data to change all files with a time to display as a military time. In this case, the software 40 will apply a change to all files containing a time (S380)-(S390). For the second change, the software 40, for example, receives data identifying files with a dash after a time as target files (S370). Then, the software 40 makes this change (a dash to a colon) in files that meet this criterion (S380)-(S390). In the case of the third change, the software 40 receives data identifying any file with the name of a US City as a target file (S370). Then, the software 40 then makes this change to any file that meets this criterion (S380)-(S390).

The changes the software 40 obtains from the source file are not always identical to the changes the software implements in the target files. For example, if in the source file, the original element "Albany International," was changed to "ALB," the airport code, the software 40 identifies the supported change using one or more data libraries 130 as converting airport name to airport code. Then, when a target file includes the text, "Chicago O'Hare International," the software 40 applied the type of change to convert this text to "ORD," so that the displayed change in the thin client, contains "ORD," in place of "Chicago O'Hare International."

Figure 4:
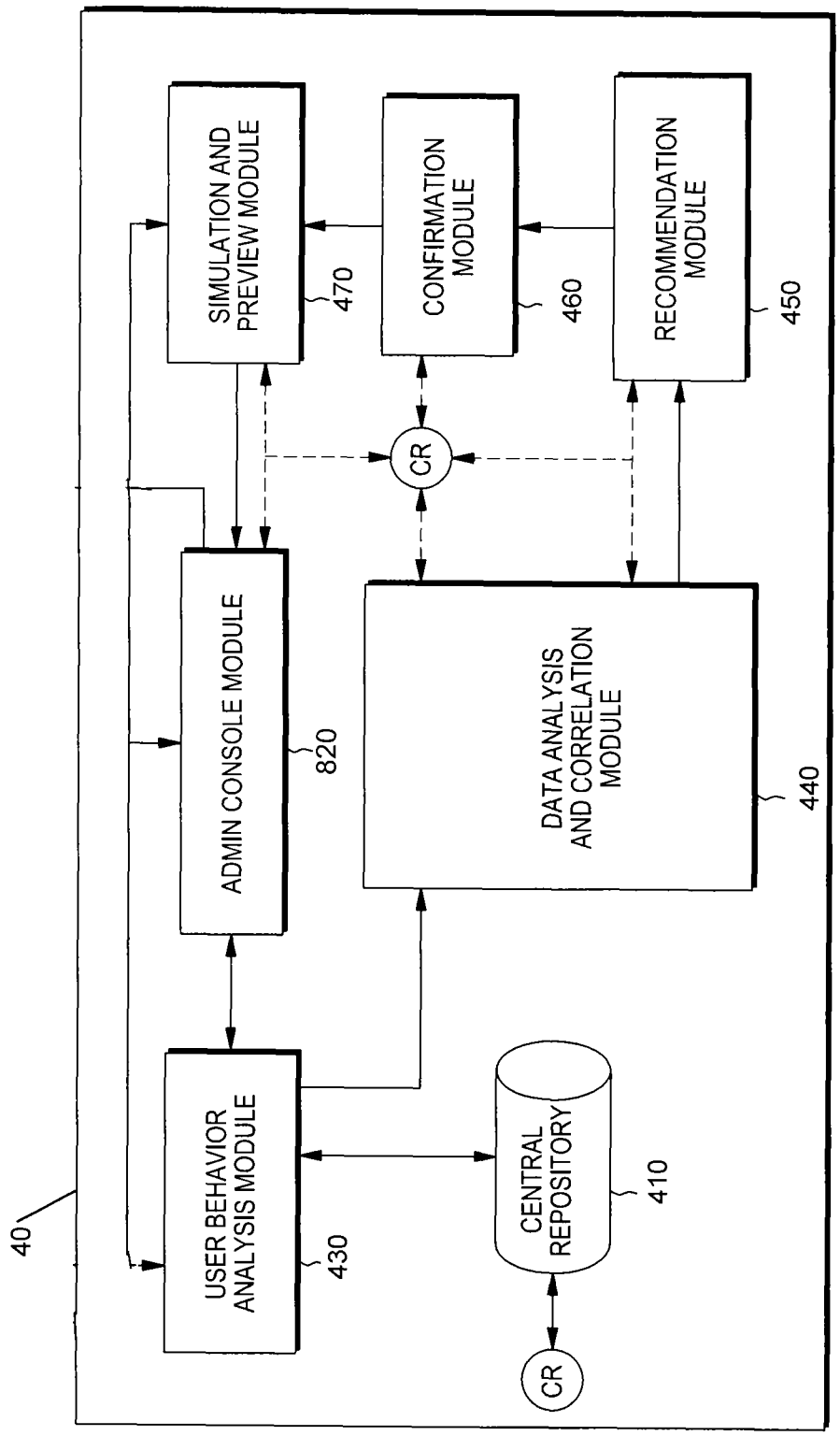
FIG. 4 depicts one example of a modular representation of one or more aspects of an embodiment of the present invention.

In the embodiment of FIG. 4, different functionalities in the workflow of FIG. 3 are separated into different computing modules of the software 40. These computing modules are comprised of computer code that is executed on one or more processors in a computer system, such as a client computing device and/or a server, and/or a computer resource that is accessed by a client computing device, such as a cloud resource. These modules can be local to one resource and/or distributed over a variety of resources in a computing environment.

A brief overview of each of the modules in FIG. 4 is followed by a more detailed description of each. In the embodiment of FIG. 4, the software 40 is comprised of the following modules: a Central Repository 410, an Administrative Console 420, a User Behavior and Analysis Module 430, a Data Analysis and Correlation Module 440, a Recommendation Module 450, a Confirmation Module 460, and a Simulation and Preview Module 470.

As aforementioned, the software 40 determines if a change to a source file is supported by one or more data libraries 130. Referring to FIG. 4, Central Repository 410 stores data, such as the data libraries 130, that the software 40 utilizes to determine that the changes that a user and/or process made to a source file, to identify target files to which the software 40 will make the same type of changes, and to make the same type of changes to the target files, and in some embodiments of the present invention, to formulate the change the software 40 makes to the additional files.

In this embodiment, a user may access Administrative Console 420 through a user interface on a computing device in a computing environment. The Administrative Console 420 of the software 40 allows a user with proper security privileges to edit the stored data in the Central Repository 310, including editing data in one or more data libraries 130.

In this embodiment, the User Behavior Analysis Module 430 obtains the change to the source file. The User Behavior Analysis Module 430 of the software 40 enables the software to observe and analyze the changes a user and/or process makes to the source file. In addition to logging the actual changes made in the Central Repository 410, for example, as an audit trail, the User Behavior Analysis Module 430 also contains code that allows the software 40 to log the type of changes made, predict additional changes, and even suggest changes to the user.

In this embodiment, the Data Analysis and Correlation Module 440 determines whether the change made to the source file is supported by one or more of the data libraries 130 in a pre-defined list of data sources (in the Central Repository 410). Program code in the Data Analysis and Correlation Module 440 of the software 40 analyzes the changes a user and/or process make in the source file and matches those changes to changes supported by one or more of the data libraries 130 in the Central Repository 410.

In this embodiment, the Recommendation Module 450 analyzes one or more of the data libraries 130 that support the change, and the Recommendation Module 450 formulates the changes to the target files. The Recommendation Module 450 receives the changes observed by the User Behavior Analysis Module 430 and the one or more of the data libraries 130 in the Central Repository 410 that the Data Analysis and Correlation Module 440 matched to the changes and recommends changes to target files based on this data. In an embodiment of the present invention, the software 40 displays the recommendations to a user before implementing the recommended change(s) to one or more of the target files.

The Confirmation Module 460 tracks whether a user confirms the changes to target files recommended by the Recommendation Module 450. The software 40 displays the recommended changes to a user utilizing the Simulation and Preview Module 470. Thus, the Confirmation Module 460 and the Simulation and Preview Module 470 may work together to display recommended changes to target files to a user and to receive a response from the user for each recommended change.

In this embodiment, after Confirmation Module 460 receives a response from a user, the software 40 applies changes to the target files.

Figure 5:
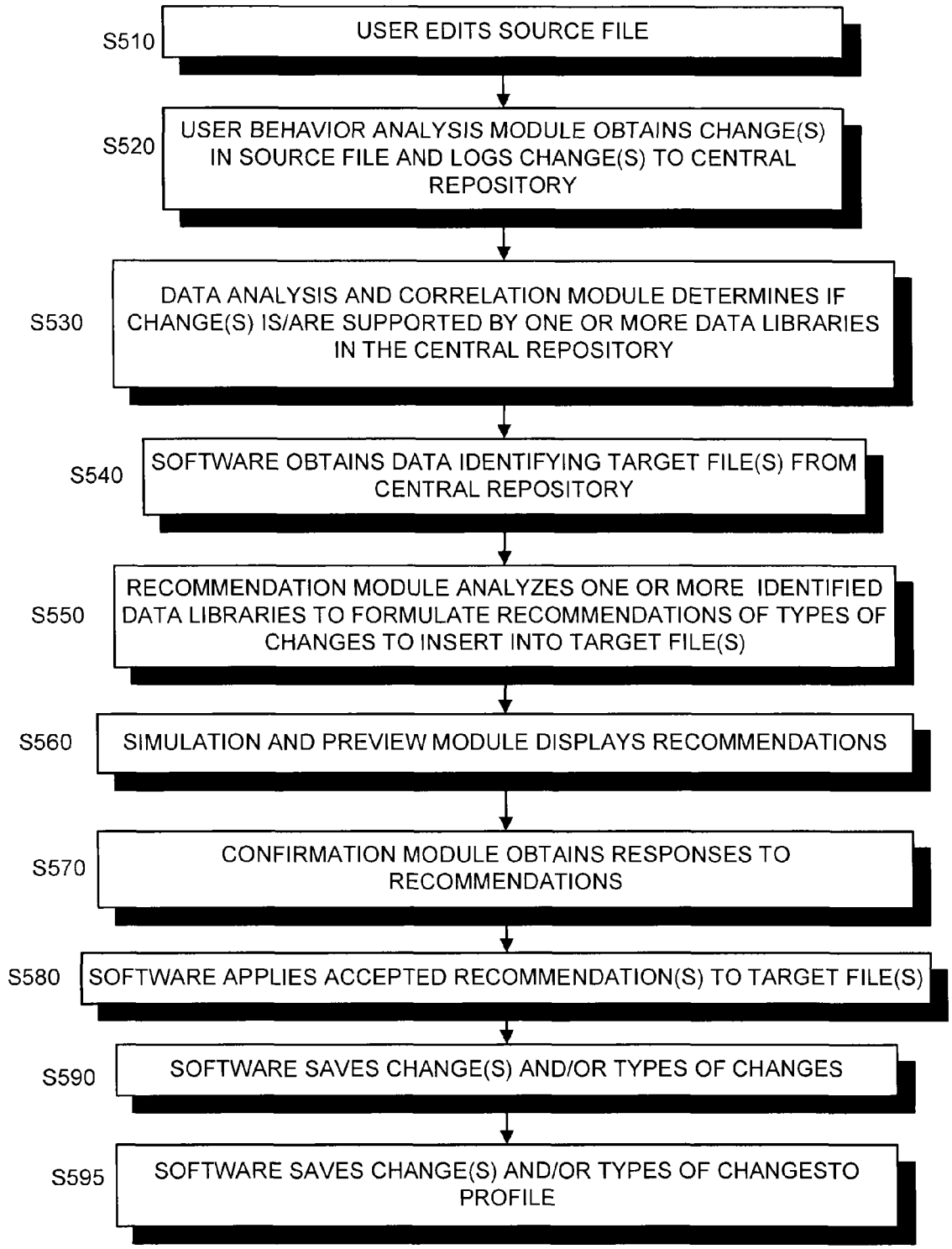
FIG. 5 depicts a workflow of one embodiment of a method for dynamically enhancing and visually synchronizing elements in a display on a computing device, in accordance with one or more aspects of the present invention.

FIG. 5 depicts a workflow of one embodiment for a method for dynamically enhancing the display elements when files associated with web pages are displayed on computing devices 140a-140f, in accordance with one or more aspects of the present invention. Specifically, FIG. 5 depicts the software 40, as delineated into modules in FIG. 4, practicing an embodiment of the method. In FIG. 5, the various modules of the software 40 read, write, and analyze data in the Central Repository 410. Thus, FIG. 5 can be understood to depict the software 40 interacting with the data in the Central Repository 410. Additionally, FIGS. 6-10 provide examples of functionality discussed in reference to FIG. 5.

Referring to FIG. 3, the aforementioned data libraries 130 that the software 40 utilizes to implement the type of changes to target files that a user previously applied to a source file, are located in a Central Repository 410. The software 40 stores data and accesses the data stored in the Central Repository 410 in this embodiment of the present invention. Data stored in the Central Repository 410 includes, but is not limited to: 1) data utilized by the software 40 to analyze the changes made by a user to a source file and determine whether these changes are supported by one or more of the data libraries 130 (and the software 40 can implement the same type of changes in target files); 2) data the software 40 references to make supported changes to target files; 3) data the software 40 utilizes to aggregate files and/or portions of target files for analysis and editing; 4) data that comprises the changes and profiles containing changes and/or types of changes; 5) security information associated with the stored data, including, but not limited to, security associated with data libraries, changes, and/or profiles; 6) data that the software 40 obtained through graphical user interface (GUI) interactions with a user utilizing a client computing device 140a-140f; and 7) audit data that the software 40 logs by tracking changes made to files utilized by the system, including but not limited to source files, target files, and/or data libraries.

In an embodiment of the present invention, by interacting with a computer system though an interface that is part of the Administrative Console 420 of the software 40, a user, who meets security requirements, can edit the stored data in the Central Repository 410. A user with proper security credentials can utilize the interface to perform activities that include, but are not limited to, the following: change the permissions of users who utilize certain profiles, apply profiles to target files, update changes in established profiles, change the criteria the software 40 will use to identify target files, and/or change the permissions required for a user and/or process to access a given data library.

In embodiments of the present invention, the Central Repository 410 can reside on one of many physical machines and/or on an external memory resource. In an embodiment of the present invention, all or a portion of the Central 410 repository, resides locally on a resource on a computing device 140*a*-140*f*. In a further embodiment of the present invention, one or more of the modules depicted in FIG. 4, including the Central Repository 410, utilizes one or more resources in a shared data storage and management system, such as a cloud.

Returning to FIG. 5, a user (and/or process) implements one or more changes to a file, i.e., a source file, by editing the source file utilizing resources accessible by a computing device 140*a*-140*f* (S510). As the change is being made, the User Behavior Analysis Module 430 of the software 40 obtains the one or more changes and logs audit data in the Central Repository 410 (S520). This audit data comprises the state of the source file before the user and/or process made the one or more changes and the state of the source file after the user and/or process made the one or more changes.

FIG. 6 is an example of a display in a web browser on computing device 140*a*-140*f* of a web page. In FIG. 6 no user and/or process had implemented changes to a source file associated with the web page. FIG. 7 is an example of a source file associated with a web page after a user and/or process has made change. Both FIG. 6 and FIG. 7 contain information about a flight from Austin, Tex. to Las Vegas, Nev., the date of the flight, and the departure time. However, in FIG. 7, a user has implemented changes to the source file to consolidate the information onto a single line, list only the departure time, format the date as numbers, and use the symbol "@."

Returning to FIG. 4, the User Behavior Analysis Module 430 of the software 40 obtains the changes to the file, for example, the changes implemented by a user to create FIG. 7, by detecting when an original element of the source file is converted to a new element of the source file, for example, when an item in the source file is changed, such as text and/or formatting. The User Behavior Analysis Module 430 of the software detects elements that include, but are not limited to, the number of occurrences of the change to the source file, the type of change, any trend in changes made to the source file by the user and/or process, the frequency of the changes, and/or the priority, if any, of the changes. In an embodiment of the present invention, the User Behavior Analysis Module 430 can recognize that the changes a user made to the source file correlate with an existing change profile in the Central Repository 410. The User Behavior and Analysis Module 430 supplies the obtained change to the Data Analysis and Correlation Module 440 to assist the Data Analysis and Correlation Module 440 in the software 40 in determining whether these changes are supported by one or more data libraries 130 in the Central Repository 410.

Additionally, in an embodiment of the present invention, the User Behavior and Analysis Module 430 assists users in catching erroneous changes made to source files. The User Behavior and Analysis Module 430 alerts users to possible problems with changes by assigning accuracy/confidence ratings to these changes. For example, if a user and/or process makes a change to a source file that caused errors 90% of the time when the software 40 implemented the change to target files in the past, the User Behavior and Analysis Module 430 logs and saves this information and assigns this change a low confidence score. Thus, when a user seeks to implement this change across target files in the computer system, the Recommendation Module 450 accesses the low confidence score assigned by the User Behavior and Analysis Module 430 of the software 40 and alerts the user, for example in a message in a GUI, that this change has a low confidence/accuracy rating and could cause system issues.

The Data Analysis and Correlation Module 440 determines if the change or changes made to a source file are supported by one or more data libraries 130 in the Central Repository 410. The Data Analysis and Correlation Module 440 of the software 40 utilizes data stored in the Central Repository 410 and analyzes the one or more changes made to the source file and determines whether any of the one or more changes is supported by data in one or more of the data libraries 130 in the Central Repository 410 (S530). In a further embodiment of the present invention, if the software 40 cannot locate one or more data libraries 130 in the Central Repository 310 to support a change made to a source file, the software 40 searches accessible resources, including publicly available resources on the Internet, to locate a data source to support the change. For example, if a user and/or process updates a zip code in a source file, the Data Analysis and Correlation Module 440 of the software 40 recognizes this change as a zip code update in a source file. However, if there is no zip code resource in one or more of the data libraries 130, the software 40 in the Data Analysis and Correlation Module 440 searches the web for a zip code repository it can reference to update all zip codes in system files. In a further embodiment of the present invention, after the software 40 locates this repository, the software 40 copies the repository and saves it in the Central Repository 410 for use in subsequent updates.

The software 40 obtains data identifying target files. In an embodiment of the present invention, the software 40 obtains this data from the Central Repository 410. The software 40 accesses the Central Repository 410 to obtain data that software 40 uses to identify target files, including to aggregate files and/or portions of target files for analysis and editing (S540). For example, in an embodiment of the present invention, the software 40 obtains a reference list from the Central Repository 410. This reference list correlates the changes supported by a given data library of data libraries 130 with the files that contain elements where the same type of change should be implemented if the change is made to a source file. Thus, in this embodiment, the reference list itself designates the target files. For example, if the saved type of changes relate to a user preference regarding how travel itinerary should be displayed in a web browser, the reference list could be a list of travel web sites.

Returning to FIG. 5, after the software 40 has obtained data identifying the target files, the software 40 utilizes the data to make the same type of changes in target files that the software 40 identified. Specifically, the software 40 analyzes the one or more relevant data libraries of data libraries 130 and/or any relevant resources accessible to the software 40, to formulate the specific changes that the software 40 will apply to existing items in these target files. The software 40 makes changes to the target files as they are accessed by a computing device 140*a*-140*f*. The software 40 applies changes that affect how the web pages associated with the target filed are displayed on the computing device 140*a*-140*f*.

In this embodiment of the present invention, rather than automatically apply changes to identified target files when they become available because they are received by the computing device 140*a*-140*f* (for example, when the browser on the computing device 140*a*-140*f* requests a web site that is listed in the reference list), the Recommendation Module 450 of the software 40 analyzes the data libraries 130 and/or any relevant resources and creates recommendations for changes to target files based on changes the software 40 identified as being supported by one or more data libraries (S550). The software 40 displays the changes to a user with the Simulation and Preview Module 470 (S560) and records a user's acceptance and/or rejection of each displayed change with the Confirmation Module 460 (S570). Then, the software 40 applies the changes that the user accepted to the target files (S580).

Figure 9:

FIG. 8 is an example of a preview generated by the Simulation and Preview Module 470 containing a recommendation by the Recommendation Module 450. In FIG. 8, the software 40 causes the browser to display both the unchanged content, as seen in FIG. 6, and the content after the software 40 applied the supported type of change(s) implemented in the source file, as seen in FIG. 7. The user of the computing device 140a-140f views the recommended display and can accept each change by utilizing the Confirmation Module 460. FIG. 9 is an example of a graphical user interface for the Confirmation Module 460 in an embodiment of the present invention. In FIG. 9, the user has highlighted the content of the source file and is in the process of responding to the recommended change.

Figure 10:

In embodiments of the present invention, the manner in which the software 40 displays the preferences of a user vary. In FIG. 10, the software 40 displays information in a manner defined by supported changes when user highlights data in the standard display. In FIG. 10, the user has highlighted itinerary information. When the user highlights this information, the software 40, receives target file information, applies changes to the target file data, and displays the changed data. Note that the thin client, for example, a browser, also displays the unchanged data, in this embodiment. The method of highlighting the data includes, but is not limited to, utilizing an I/O device, such as a mouse, to select and/or hover over one or more elements in the display.

In another embodiment of the present invention, after the software 40 receives target file information, applies changes to the target file data, and displays the changed data, when a user highlights one or more elements of the changed data, the software 40 displays the target file data as if the software 40 had not applied the changes. The method of highlighting the data includes, but is not limited to, utilizing an I/O device, such as a mouse, to select and/or hover over one or more elements in the display.

Returning to FIG. 4, as aforementioned, the Recommendation Module 450 can provide information to a user that assists the user in deciding whether the same type of change the user made to a source file should be implemented across target files in the computer system. In addition to providing a user with a confidence/accuracy rating, in embodiments of the present invention, the Recommendation Module 450 can also track the status of changes while they are being implemented to various target files, allowing the user to instruct the software 40 to stop or roll back the changes. The Recommendation Module 450 can be pre-configured in some embodiments of the present invention so that while the software 40 implements certain changes to certain files automatically, user approval is required for certain changes and/or certain files. The Recommendation Module 450 in some embodiments can be configured to automatically cancel application to a target file of a same type of a change made to a source file if the confidence/accuracy rating of the change does not meet a certain threshold. In an embodiment of the present invention, when the Recommendation Module 450 does not apply a change below a certain threshold, the software 40 generates a display on a thin client in the computing device 140a-140f indicating the error. In a further embodiment of the present invention, the Recommendation Module 450 forms recommendations analyzing resources that include, but are not limited to, the data libraries 130, key words found in a source file, relevance, and/or historical data.

In the embodiment of FIG. 4, the Simulation and Preview Module 470 provides previews, including visuals and simulations, of the changes that the software 40 recommends are implemented to the target files by analyzing the relevant data libraries 130. For example, the functionality of the Simulation and Preview Module 470 includes, but is not limited to, displaying target files after changes are applied and creating simulations to simulate the functionality of the computer environment after the software 40 applies the changes to the target files, and/or validating supported changes before applying the changes to target files. In various embodiments of the present invention, the Simulation and Preview Module 470 can generate a report identifying the impact of implementing changes to the target files, display recommendations for additional retained changes or different changes, and display the success rate of the implementation of one or more changes.

The Simulation and Preview Module 470 can change the change, type of change and/or the contents of a profile based upon the responses from a user to the previews and simulations. For example, in an embodiment of the present invention, as a user selects and rejects different changes and/or types of changes in a given profile, Simulation and Preview Module 470 updates the saved profile in the Central Repository 410 to reflect these new preferences. Thus, should a user select this profile at a later time, the changes and/or types of changes the software 40 applies to target files will reflect the preferences of the earlier user.

In an embodiment of the present invention, the Simulation and Preview Module 470 checks the efficacy of a change to a source file before the software 40 applies the recommended changes to target files. For example, for a given change to a source file in a given embodiment, the Simulation and Preview Module 470 verifies that the target files exist, verifies that the paths to the target files are correct, checks whether the data library of data libraries 130 utilized contains useable data, and/or checks whether the identified target files contain elements to which the software 40 can apply the same type of change made to the source file.

In an embodiment of the present invention, after applying the same type of change to at least one target files, the software 40 retains the change and/or type of change made to source file and then the target files by saving the change and/or type of change on a resource in or accessible to the Central Repository 410 (S590). In embodiments of the present invention, not only does the Confirmation Module 460 in FIG. 4 provide the functionality of soliciting a confirmation and/or rejection of one or more changes, but the Confirmation Module 460 also tracks the results, logging audit information as the user responds to each simulated change to a target file created by the Simulation and Preview Module 470. The Confirmation Module 460 logs confirmation and/or rejection data in the Central Repository 310 which data includes, but is not limited to, date of change, user who confirmed change, time of confirmation, location in file of change, and/or additional audit information. In an embodiment of the present invention, the User Behavior and Analysis 430 includes the confirmation retained data related to a given change when calculating the overall success rate of the change.

In an embodiment of the present invention, the changes that the software 40 applied to one or more of the target files may only reflect some of the changes that a user desires to make to a display of a given web page. In this case, after the software 40 applies the change and/or profile, the user can continue to make changes to a displayed file. The software 40 can track these additional changes and add the changes and/or the types of changes to a profile the software 40 retained on a system resource.

The software 40 can save the change and/or the type of change as part of a profile (S595). In an embodiment of the present invention, subsequent users and/or processes can access the saved changes and/or profiles in the Central Repository 310 and use the software 40 to apply them to additional files. In a further embodiment of the present invention, individual user profiles are stored locally on computing devices 140a-140f.

In an embodiment of the present invention, whether or not the software 40 propagates the same type of change, made by a user in a source file, to one or more target files can depend upon the security clearance of the user. In the embodiment of FIG. 4, the Central Repository 410 stores security information associated with the stored data, including but not limited to, security associated with data libraries 130, changes, and/or profiles. Returning to FIGS. 1-2, as aforementioned, the software 40 utilizes one or more data libraries 130 as resources when recognizing a change in a source file and deciding how the same type of change should be implemented to one or more target files that may contain different data. In various embodiments of the present invention, an administrator can assign permissions to data libraries 130. Whether a user utilizing software 40 has the appropriate permissions impacts how the software 40 applies the same type of changes to source file to one or more target files. In an embodiment of the present invention, a system administrator can configure permissions so that only a user with sufficient security credentials can access a given data library.

Accordingly, as set forth herein, the software 40 obtains security credentials from a client, i.e., the user and/or process, who implemented the change to the source file. Thus, when a user accesses the software 40, the software 40 determines whether the user can access a data library 130 and/or whether the user can make changes to target files. Therefore, even if a user has made a change to a source file that is supported in a data library of data libraries 130, the software 40 will not make the same type of change to a target file if the user does not have sufficient permissions to access the data library or data libraries 130 that supports the change and/or if the user does not have sufficient permissions to edit the target file.

Returning to FIG. 4, depending upon whether the target files and/or the data libraries 130 supporting the changes require security privileges to access them, the software 40 obtains security credentials on the user while the software 40 determines whether a change is supported by a data library of data libraries 130 (S530) and when obtaining data identifying the target files (S440). In an embodiment of the present invention, the software 40 reports an error to the user if the change to the source file is identified and the same type of change cannot be applied to one or more target files due to the user not having sufficient permissions to access the data library of data libraries 130 and/or to edit the one or more target files.

In an embodiment of the present invention, a user with proper security privileges can utilize the Administrative Console 320 to access an existing profile in the Central Repository 310 and apply that profile to a user or a group of users. In this manner, the software 40 is used to standardize the way that select individuals see types of data across an organization.

FIGS. 3 and 5 show the application of one change and/or profile to a group of target files. However, software in embodiments of the present invention is capable of negotiating the applications of two or more types of change and/or profile to one or more target files, even when the type of changes conflict.

In an embodiment of the present invention, referring to FIG. 5, a user and/or process can input data that causes the software 40 to obtain data identifying the same target file for different profiles. For example, the software 40 obtains data identifying three different profiles with different changes to apply to the same target file: one user profile converts all currency to Japanese Yen, a second changes all airport names to airport codes, the third changes formatting using table tags to section tags in files that render the content of web pages. The software 40 obtains data identifying a target file that contains currency information, airport names, and a table. The software 40 applies the same types of changes consistent with different profiles to different portions of the target file. In some cases, the software 40 may apply same types of changes in more than one profile to the same portion of a target file. For example, in the present example, the software 40 will change a currency listing in a table to be displayed both in Yen and to utilize sections instead of table cells.

In some situations, two profiles applicable to the same target file can be mutually exclusive. In this case, in an embodiment of the present invention, the software 40 applies the profiles in a pre-defined or calculated order of priority. For example, a user could have a profile for deleting currency information pertaining to motor vehicles and another for converting all currency to Euros. On a target file containing car prices, if the car information profile carries a higher priority than the currency profile, the software 40 deletes the prices, but if the currency profile carries a higher priority, the software 40 converts the car prices to Euros. In another embodiment of the present invention, the software 40 utilizes priorities associated with different changes within different profiles, or within the same profile to determine the order in which the changes are applied.

In the examples above, only a single change was associated with each profile, however, these examples are offered merely for clarity. One of skill in the art will recognize that an unlimited number of changes as well as an unlimited number of data libraries 130 can be associated with a given profile and/or group of changes, in various embodiments of the present invention. For example, a single profile can contain instructions to convert all currency to Japanese Yen, change all airport names to airport codes, and convert table tags to section tags in code. In one example, to apply this profile to a target file, the software 40 consults a data library with entries of conversions rates of various world currency to Japanese Yen, a data library that matches airport codes to full names, and a data library with formatting instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
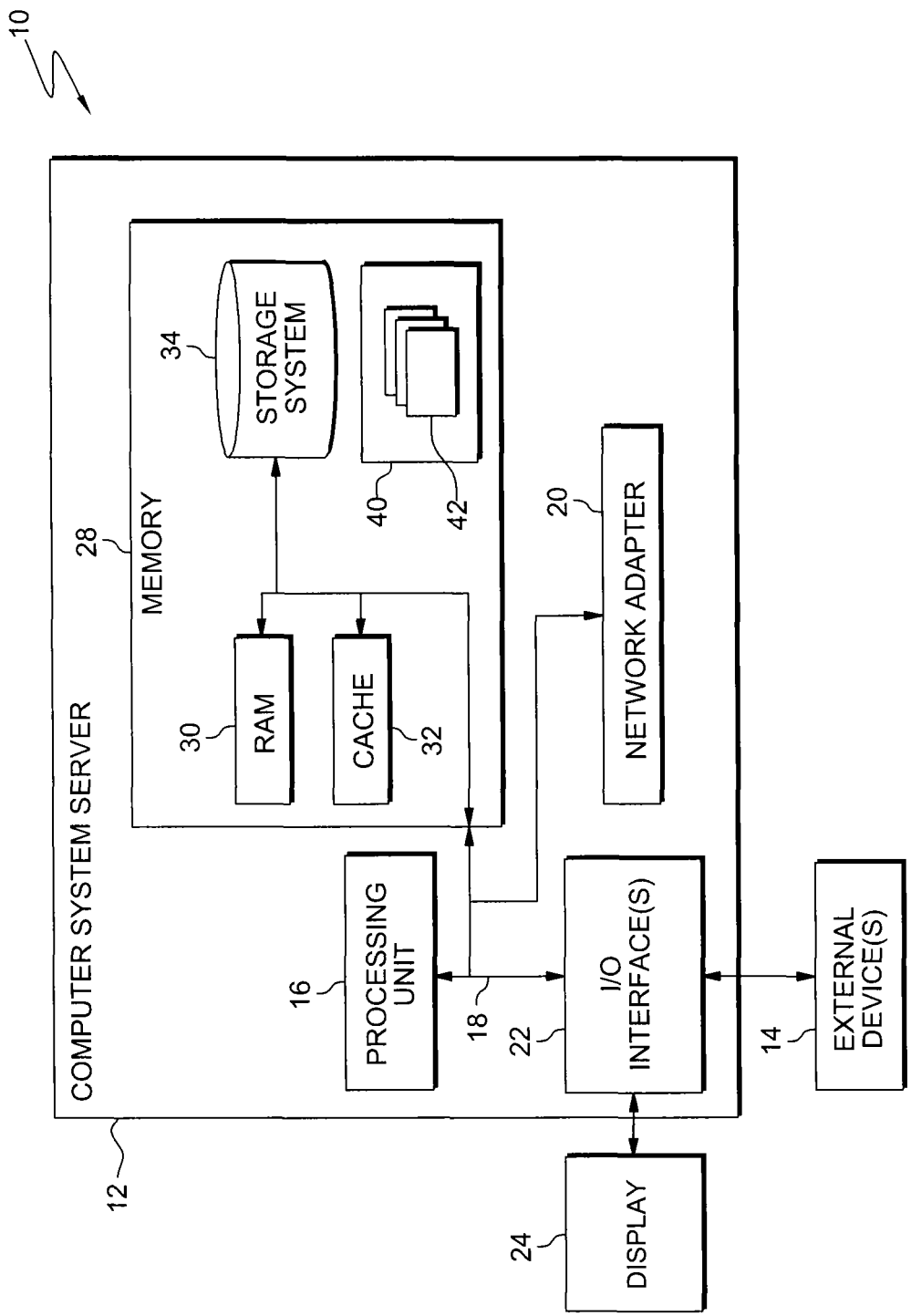
FIG. 11 depicts a schematic of an example of a cloud computing node.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Software 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
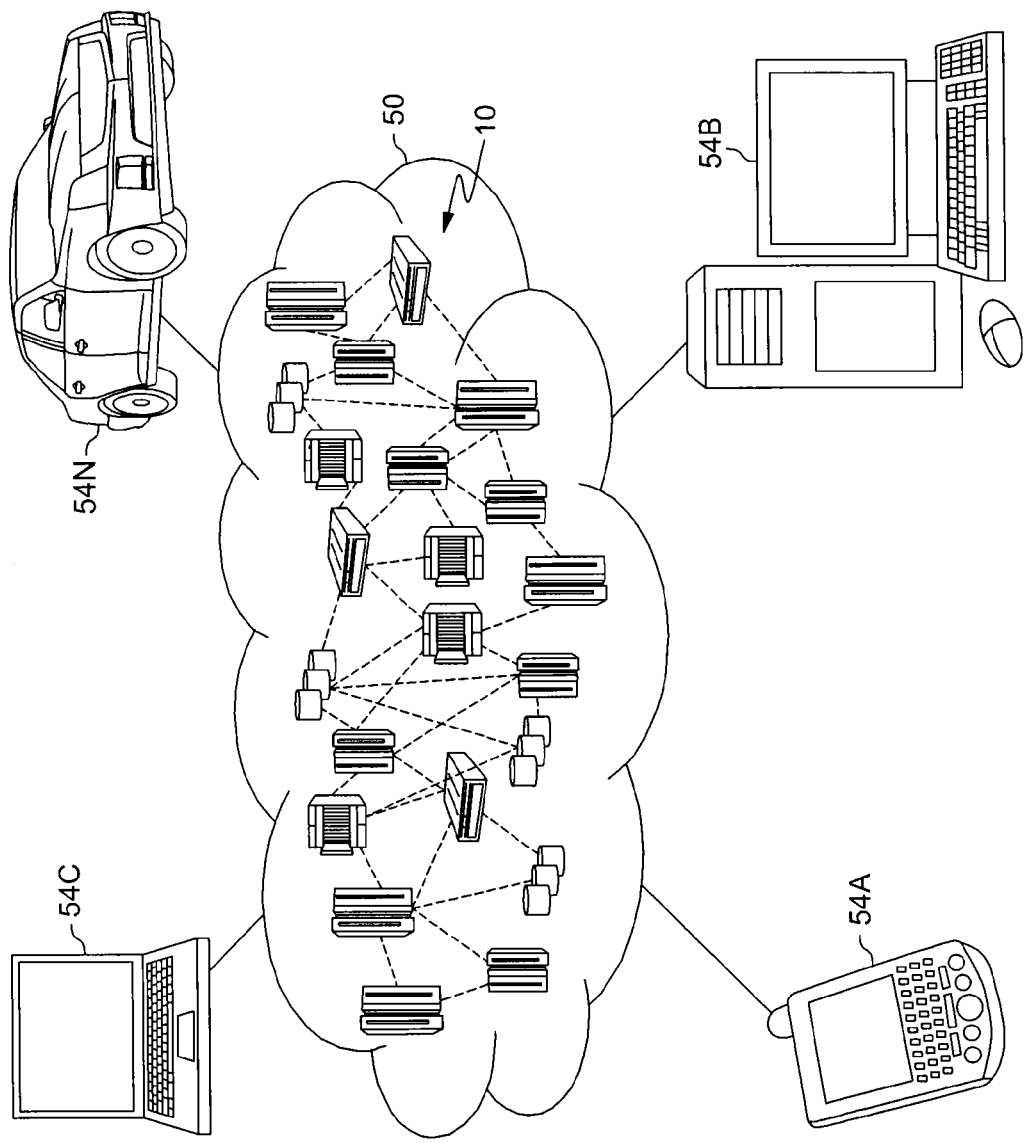
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 13:
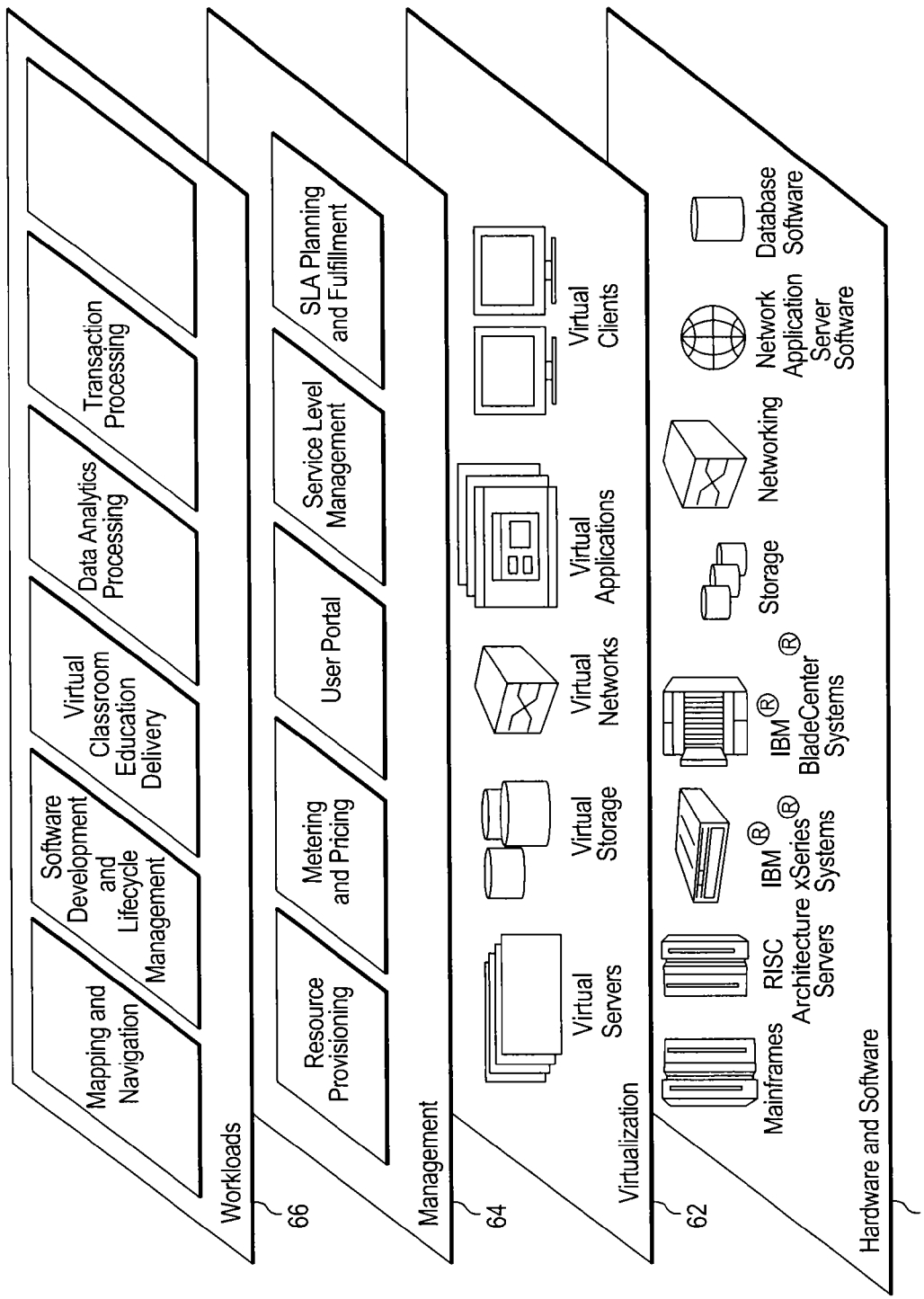
FIG. 13 depicts abstraction model layers according to an embodiment of the present invention.

Referring now to FIG. 13, a set of functional abstraction layers provided by cloud computing environment 50 (FIG. 11) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; retention and application of library data in accordance with user profiles, which may also be stored at this layer.

Based on the foregoing, a computer system, method, and program product have been disclosed for dynamically enhancing the user interface on a computing device. However, numerous modifications and substitutions can be made without deviating from the scope of the present invention. Therefore, the present invention has been disclosed by way of example and not limitation.

Figure 14:
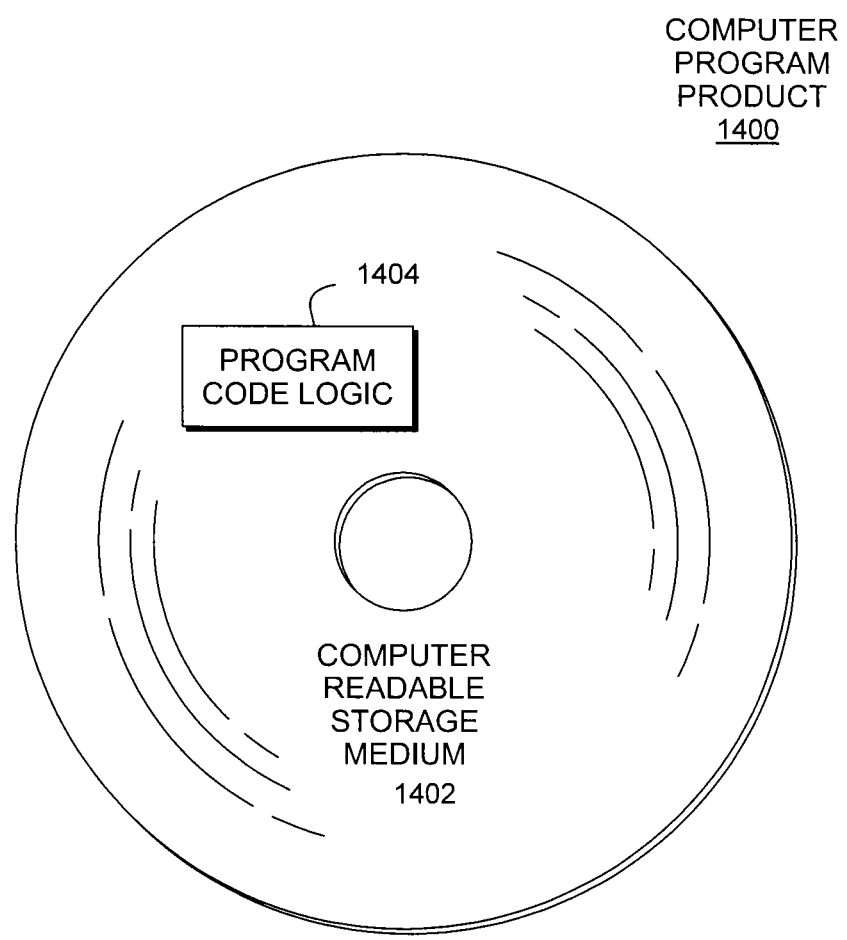
FIG. 14 depicts a computer program product utilized to practice one or more aspects of an embodiment of the present invention.

Using the processing resources of a resource to execute software, computer-readable code or instructions, does not limit where this code is can be stored. Referring to FIG. 14, in one example, a computer program product 1400 includes, for instance, one or more computer readable storage media 1402 to store computer readable program code means or logic 1404 thereon to provide and facilitate one or more aspects of the present invention. In one embodiment, the computer readable program code means or logic 1404 includes program code for software 40.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically enhancing and visually synchronizing elements in a display on a computing device, the method comprising: obtaining, by a processor, a first change to a first file; determining if the first change is supported by a data library; analyzing, by the processor, the data library to determine a format type of the first change; applying a second change to a second file so that an element of the second file updated by the second change is synchronized to an element of the first file updated by the first change, wherein the second change is the format type of the first change, and wherein the first change and the second change are not identical; and generating a display associated with the second file on the computing device wherein the display comprises the type of change applied to the second file.

2. The method of claim 1, further comprising, before the applying: generating a simulation of a display associated with the second file on the computing device, wherein the display comprises the type of change applied to the second file; and soliciting a response from a client in connection with the simulation.

3. The method of claim 2, further comprising: saving the response from the client; and saving the type of change.

4. The method of claim 3, further comprising: associating a score with the saved type of change based on the response from the client.

5. The method of claim 4, further comprising: obtaining an instruction selecting the saved type of change; obtaining data identifying a third file; applying the saved type of change to the third file; generating a display associated with the third file wherein the display comprises the saved type of change applied to the third file; and indicating the score to a client.

6. The method of claim 4, further comprising: obtaining an instruction selecting the saved type of change; obtaining data identifying a third file; obtaining the score associated with the type of change; evaluating whether the score is above a predefined score; generating an error message in the display when the score is below the predefined score; and generating a display associated with the third file wherein the display comprises the saved type of change applied to the third file when the score is equal to or above the predefined score.

7. The method of claim 3, further comprising: obtaining additional data identifying a plurality of files; applying the saved type of change to each file of the plurality of files; and generating a plurality of displays, wherein each display is associated with a file of the plurality of files, and wherein said each display comprises the saved type of change applied to a respective file of the plurality of files.

8. The method of claim 1, further wherein the obtaining comprises obtaining the data identifying the second file from a pre-defined list on a resource accessible to the device via a network connection.

9. The method of claim 1, further comprising: generating a second display wherein the second display is associated the second file before applying the type of change; obtaining, by the processor, an instruction selecting the type of change applied to the second file; displaying, responsive to the selecting, the second display.

10. The method of claim 9, further comprising: obtaining instructions selecting at least one of the display or the second display; and displaying the selected one or more displays on the computing device.

11. The method of claim 1, wherein the display associated with the second le is a web page and wherein the display on the computing device is a web browser.

12. The method of claim 1, wherein the method includes obtaining data identifying a second file, wherein the obtaining data identifying a second file comprises obtaining, by the processor in a first network domain, a web page from a device in a second network domain.

13. A computer program product for dynamically enhancing and visually synchronizing elements in a display on a computing device, the computer program product comprising a computer readable hardware storage device and program code stored on the computer readable hardware storage device, the program code executable by a processing circuit to perform a method comprising: obtaining a first change to a first file; determining if the first change is supported by a data library; analyzing the data library to determine a format type of the first change; applying a second change to a second file so that an element of the second file updated by the second change is synchronized to an element of the first file updated by the first change, wherein the second change is the format type of the first change, and wherein the first change and the second change are not identical; and generating a display associated with the second file on the computing device wherein the display comprises the type of change applied to the second file.

14. The computer program product of claim 13, further comprising, before the applying: generating a simulation of a display associated with the second file on the computing device, wherein the display comprises the type of change applied to the second file; and soliciting a response from a client in connection with the simulation.

15. The computer program product of claim 13, further comprising: saving the type of change: obtaining an instruction selecting the saved type of change; obtaining data identifying a third file; applying the saved type of change to the third file; generating a display associated with the third file wherein the display comprises the saved type of change applied to the third file; and indicating a score to a client.

16. A computer system product for dynamically enhancing and visually synchronizing elements in a display on a computing device, the computer system comprising a computer readable storage medium, a processor, and program code stored on the computer readable storage medium and executable by the processor to perform a method comprising: obtaining, by the processor, a first change to a first file, and data identifying a second file; determining if the first change is supported by a data library; analyzing, by the processor, the data library to determine a format type of the first change; applying a second change to the second file so that an element of the second file updated by the second change is synchronized to an element of the first file updated by the first change, wherein the second change is the format type of the first change, and wherein the first change and the second change are not identical; and generating a display associated with the second file on the computing device wherein the display comprises the type of change applied to the second file.

17. The method of claim 1, wherein the data library defines and supports changes in files, and wherein the second file is external to the data library.

18. The method of claim 1, wherein the data library defines changes, and wherein the method includes detecting the first change in the first file and checking the change against data of the data library to determine if the first change is defined in a data library.

19. The method of claim 1, wherein the method includes, based on data of the data library determining the type of change that was made to the first file and formulating how to apply the type of change to the second file.

20. The method of claim 1, wherein the type of change is a first type of change, wherein the data library includes data that cross references a plurality of target files to the first type of change, and wherein the method includes using the data library so that responsively to a change being made to the first file of the first type of change, changes of the first type of change are automatically implemented in each of the plurality of target files cross referenced to the first type of change.

21. The method of claim 1 wherein the format type of change includes one or more of the following selected from the group consisting of (a) a format type of change relating to use of abbreviations, (b) a format type of change relating to layout of information, (c) a format type of change relating to number of lines of information, (d) a format type of change relating to whether certain information is presented or not presented, (e) a format type of change relating to presentment of date information, (f) a format type of change relating to presentment of time information, and (g) a format type of change relating to presentment of information in letter or symbol format.

\* \* \* \* \*